United States Patent Office 3,324,104
Patented June 6, 1967

3,324,104
BENZIMIDAZOLE BASIC AZO DYESTUFFS
Robert Frederic Michel Sureau, Enghien-les-Bains, and Gilbert Victor Henri Kremer, Ermont, France, assignors to Etablissements Kuhlmann, Paris, France
No Drawing. Filed Nov. 19, 1963, Ser. No. 324,862
Claims priority, application France, Nov. 20, 1962, 915,956
1 Claim. (Cl. 260—157)

The present invention is concerned with new basic dyestuffs of the benzimidazole series and processes for their preparation.

According to the present invention there are provided new basic dyestuffs having the general formula:

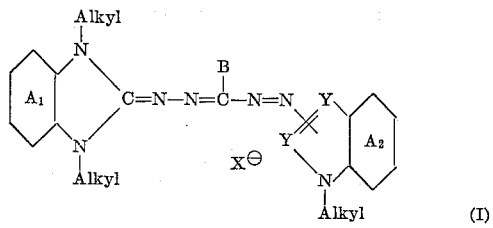

wherein the nuclei $A_1$ and $A_2$ may be substituted by the same or different non-solubilising substituents, such as for example halogen atoms, nitro, alkyl, alkoxy, alkylsulphonyl or sulphonnamido groups, B represents a hydrogen atom or an alkyl or phenyl group, which may be substituted by non-solubilising substituents such as for example halogen atoms, nitro, alkyl, alkoxy, alkylsulphonyl or sulphonamido groups, one Y represents a

and the other a carbon atom attached to the 1,2,4,5-tetraza-pentamethine chain, X represents a monovalent anion and the "Alkyl" groups are the same or different.

The present invention further provides a general method of preparation of the dyestuffs having Formula I which comprises condensing, in a first stage, for example in aqueous or aqueous-organic solution, a hydrozone having the general formula:

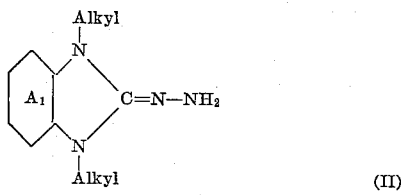

with an aldehyde of the formula O=CH—B (III).

In the Formulae II and III nucleus $A_1$ may have the same substituents as mentioned above, B has the same significance as above, and the "Alkyl" groups are the same or different.

The hydrazones of Formula I may be used either in the free state or as salts, such as for example, salts of mineral acids. The condensation is often carried out at ambient temperature in the presence of a mild alkaline agent such as for example sodium acetate if a salt of the hydrazone is used. A ketaldazine of the following general formula is thus separated:

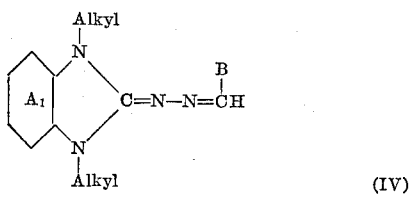

In a second stage, the ketaldazine is reacted with a hydrazone of the Formula II, or with a hydrazone of the general formula

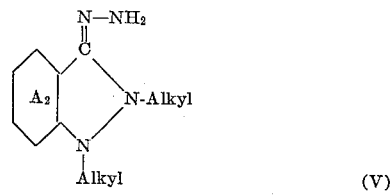

in which the nucleus $A_2$ may be substituted by substituents mentioned above and the "Alkyl" groups are the same or different.

The hydrazone of Formula II may be the hydrazone used to obtain the ketaldazine or a differently substituted hydrazones. Indazole hydrazoles of the Formula V are described in the French Patent No. 1,297,123 filed on Sept. 30, 1960.

The reaction with the ketaldazine of Formula IV may be carried out with substantially molar amounts of a hydrazone of Formula II or V, in aqueous solution and in the presence of a small quantity of an organic acid and an oxidising agent. When a salt of the hydrazone is used an agent which is an acid acceptor such as for example an alkali metal acetate or a tertiary organic base, for example, pyridine or α-picoline can also be added.

Starting from ambient temperature, a strong blue colouration develops more or less rapidly, then the dyestuff of Formula I begins to crystallise.

When the ketaldazine used is not sufficiently soluble in aqueous acid medium for reaction to occur, the reaction may be carried out in an organic solvent with water, such as an alcohol of low molecular weight or dioxan. The use of an alcohol of formula R—CH$_2$OH (VI) wherein R is different from B as solvent may, however, give a mixture of dyestuffs on account of partial oxidation of the alcohol into aldehyde.

A further embodiment of the process according to the present invention comprises taking advantage of the oxidation of an alcohol for formula B—CH$_2$—OH in the reaction medium in order to prepare dyestuffs of the Formula I, in which the nuclei $A_1$ and $A_2$ carry identical substituents in identical positions. This embodiment comprises reacting, preferably at ambient temperature, an oxidising agent with a slightly aqueous alcoholic solution of a hydrazone of Formula II or a salt thereof, in the presence of a small amount of organic acid and possibly if the salt of the hydrazone is used, a neutralising agent such as for example an alkali metal salt of an organic acid or a tertiary base such as pyridine. Aliphatic alcohols and monoalkyl ethers of ethylene glycol may be used as the alcoholic solvent. The dyestuffs separate from the reaction medium in crystalline form.

A simplification of the general process of preparing the dyestuffs is possible when the process is effected in a non-alcoholic aqueous medium. In this case it is generally unnecessary to isolate the corresponding ketaldazine. Two moles of the same or different hydrazones and one mole of aldehyde are reacted together followed by the addition of the oxidising agent.

Various conventional oxidising agents may be used to carry out any of the processes described above, for example, hydrogen peroxide, organic peracids such as peracetic acid, persalts such as perborates, persulphtaes, permanganates, chromates or dichromates, hypochlorites or hypobromites, chlorites, ferricyanides or di-oxides such as manganese or lead dioxides. It may also be advantages, in certain cases, to catalyse the reaction by the addition of small quantities of certain reducing salts, such as ferrous sulphate.

The dyestuffs formed precipitate in the crystalline state. If necessary, their separation may be completed by dilution of the medium with brine and/or by addition of a solution of zinc chloride.

The aqueous solutions of the dyestuffs of Formula I are generally stable at pH values below 7, even on prolonged boiling. This property was not obvious, since the dyestuffs of an analogous type, which are derived from 3-alkyl-2-benzothiazolone-hydrazone are very unstable in hot aqueous solution (see S. Hünig and K. H. Fritsch, Liebigs Annalen, 609–174).

The dyestuffs of the general Formula I have the properties and general applications of basic dyestuffs. They have proved particularly suitable for dyeing fibres based on polymers or copolymers of acrylonitrile. The dyestuffs provide a wide range of blues of great affinity and are endowed with excellent general fastness.

The invention is illustrated by the following examples, but is in no way restricted thereto. The proportions are by weight unless the contrary is stated.

EXAMPLE 1

33 parts of acetic acid, 16 parts of α-picoline, 0.3 part of ferrous sulphate and 20 parts by volume of a 17% aqueous solution of acetaldehyde are added to a solution of 34 parts of 1,3-dimethyl-2-benzimidazolone-hydrozone hydrochloride in 1000 parts of water.

12.8 parts of commercial sodium chlorite titrating about 80% an dissolved in 160 parts of water, are added progressively to the stirred mixture, while maintaining the temperature at 20° C. Two hours after the end of the introduction of the oxidising agent, the dyestuff is isolated by filtration, and is washed with 5% brine and dried. The weight of dyestuff obtained corresponds to a yield of 80%. It dyes polyacrylic fibres a violet-blue shade particularly fast to light.

EXAMPLE 2

20 parts of caustic soda are dissolved in 250 parts by by volume of methanol, and, while maintaining the temperature at between 20° C. and 25° C. 87.5 parts of 6-nitro-2-mercaptobenzimidazole are added, then with vigorous stirring, 57 parts of dimethyl sulphate. At the end of half an hour, a solution of 20 parts of caustic soda in 250 parts of methanol and a further 57 parts of dimethyl sulphate are added. The mixture is heated progressively up to boiling and maintained at this for 30 minutes. It is neutralised by means of 10% hydrochloric acid and diluted with 500 parts of water, filtered and the 1-methyl-2-methylmercapto-6-nitro-benzimidazole is washed and dried. Dry weight: 73 parts. M.P. 153° C.; recrystallised from benzene: M.P. 164° C.

20 parts of this product are dissolved in 100 parts of dry o-dichlorobenzene and 15 parts of dimethyl sulphate are gradually added at 80° C. The mixture is kept for 4 hours at 80° C., allowed to cool, and 200 parts of water are added. It is agitated and the aqueous solution is separated, filtered, and the filtrate introduced into a solution kept at 5° C. of 6.7 parts of hydrazine hydrate and 7.2 parts of sodium carbonate in 45 parts of water.

A brisk evolution of methylmercaptan is observed. Then concentrated hydrochloric acid is added until the pH is about 3.5, a small amount of insoluble material is filtered off, and sodium chloride is added so as to obtain a concentration of about 20% of salt. The hydrochloride of 1,3-dimethyl-6-nitro-2-benzimidazolone-hydrazone which separates in the form of yellow crystals is filtered off. This product is washed in cold 20% brine, drained and dried at moderate temperature. Dry weight: 14.8 parts titrating 75%.

34.3 parts of this hydrazone are dissolved in 1000 parts of water and 20 parts of acetic acid. 16 parts of pyridine and 12.5 parts by volume of a 17.6% solution of acetaldehyde are added. The mixture is stirred for half an hour at 20° C. then a solution of 5.9 parts of 84% sodium chlorite in 100 parts of water is introduced at this temperature in a period of one hour. The dyestuff begins to crystallise in the form of fine bronze-coloured crystals. It is stirred for 14 hours, and the crystals are filtered off, rinsed in 10% brine, drained and dried in vacuo. Weight obtained, 35 parts. This dyestuff dyes fibres based on acrylonitrile polymers a full-bodied bright blue having good general fastness.

EXAMPLE 3

On replacing the acetaldehyde in Example 1 by 8 parts of a 30% solution of formaldehyde, under similar conditions a dyestuff is obtained which provides on polyacrylic fibres a distinctly less reddish blue shade, with very similar fastness.

EXAMPLE 4

17.2 parts of 1,3-dimethyl-6-nitro-2-benzimidazolone-hydrozone hydrochloride titrating 75% are dissolved in 100 parts of water and 10 parts of acetic acid. 16 parts of pyridine and 12.5 parts by volume of a 17.6% solution of acetaldehyde are added. The mixture is stirred for half an hour at room temperature, then a solution of 15.7 parts of 1,2-dimethyl-5-nitro - 3 - indazolone - hydrazone hydrochloride, titrating 82%, in 1000 parts of water and 10 parts of acetic acid are introduced. Finally a solution of 5.9 parts of sodium chlorite, titrating 84%, in 100 parts of water is introduced over a period of about an hour. The mixture is stirred for 14 hours, and the dyestuff which crystallises is filtered off, rinsed with 10% brine and dried. Weight obtained: 34 parts. This dyestuff has properties similar to those of the dyestuff described in Example 2.

EXAMPLE 5

By replacing the acetaldehyde of Example 1 with 2.85 parts of propanal or 3.6 parts of isobutanol, there are obtained, under the same conditions, dyestuffs which dye polyacrylic fibres in shades having very similar properties.

EXAMPLE 6

6.2 parts of 6-methoxy-1,3-dimethyl-2-benzimidazoline-hydrazone hydrochloride titrating 78% are dissolved in 100 parts of water at 20° C. and 2 parts of α-picoline, 4 parts of acetic acid and 5 parts by volume of an 8.8% solution of ethanal are added.

A solution of 1.6 parts of sodium chlorite in 20 parts of water is gradually added with agitation. The solution is allowed to react for 6 hours at ordinary temperature then the dyestuff formed is isolated by filtration. It is then washed on the filter with 5% brine and dried at a low temperature. 3.2 parts of dyestuff are collected.

This dyestuff dyes polyacrylic fibres a violet blue shade which is fast to light.

EXAMPLE 7

By replacing the ethanol of Example 6 with an equivalent proportion of methanol, there are obtained, under the same conditions, a dyestuff which dyes polyacrylic fibres a bright blueish red shade that is fast to light.

EXAMPLE 8

By replacing the 6-methoxy-1,2-dimethyl-2-benzimadazolonehydrazone hydrochloride of Examples 6 and 7 with 5.8 parts of 6-methyl-2-benzimadazolone-hydrazone there are obtained, under similar conditions, dyestuffs having similar shades and properties.

We claim:
A basic dyestuff of the formula:

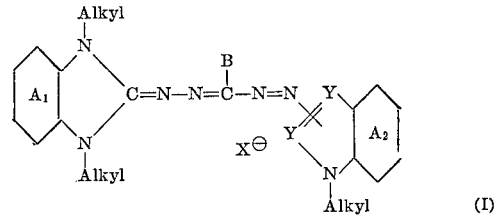

(I)

wherein the nuclei $A_1$ and $A_2$ are selected from the group consisting of unsubstituted nuclei and nuclei substituted by a member selected from the group consisting of chlorine atoms and methyl, methoxy and nitro groups, B is selected from the group consisting of hydrogen and alkyl groups having up to 3 carbon atoms, one Y represents a $$=\overset{\overset{\oplus}{|}}{N}\text{-alkyl group}$$

and the other Y represents a carbon atom attached to the 1,2,4,5-tetra-pentamethine chain and X represents a monovalent anion.

References Cited

Hunig et al. (I) Ann. Ser. Chem., vol. 609, 172–180 (1957).

Hunig et al. (II) Angew, Chem., vol. 74, pages 818–824 (1962).

Wagner et al. "Synthetic Organic Chemistry" pages 289–290 (1953).

CHARLES B. PARKER, *Primary Examiner.*

FLOYD D. HIGEL, *Assistant Examiner.*